(12) United States Patent
Saito

(10) Patent No.: US 9,720,631 B2
(45) Date of Patent: *Aug. 1, 2017

(54) RELAY SERVER, STORAGE MEDIUM STORING INSTRUCTIONS EXECUTABLE BY THE RELAY SERVER, AND CONTROL METHOD

(71) Applicant: BROTHER KOGYO KABUSHIKI KAISHA, Nagoya-shi, Aichi-ken (JP)

(72) Inventor: Ken Saito, Tokoname (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/094,416

(22) Filed: Apr. 8, 2016

(65) Prior Publication Data

US 2016/0224280 A1 Aug. 4, 2016

Related U.S. Application Data

(63) Continuation of application No. 14/661,954, filed on Mar. 18, 2015, now Pat. No. 9,311,025.

(30) Foreign Application Priority Data

Mar. 19, 2014 (JP) .................................. 2014-055967

(51) Int. Cl.
*G06K 15/00* (2006.01)
*G06F 3/12* (2006.01)
*H04L 29/06* (2006.01)

(52) U.S. Cl.
CPC .......... *G06F 3/1204* (2013.01); *G06F 3/1206* (2013.01); *G06F 3/1215* (2013.01);
(Continued)

(58) Field of Classification Search
USPC ...................................................... 358/1.16
See application file for complete search history.

(56) References Cited

U.S. PATENT DOCUMENTS 7,953,078 B2 5/2011 Sakai
2010/0149091 A1 6/2010 Kota et al.
(Continued)

FOREIGN PATENT DOCUMENTS

JP 2012-095281 A 5/2012
JP 2013-254407 A 12/2013

OTHER PUBLICATIONS

Application as filed in related U.S. Appl. No. 14/833,507, Aug. 24, 2015.

*Primary Examiner* — Jerome Grant, II
(74) *Attorney, Agent, or Firm* — Merchant & Gould P.C.

(57) ABSTRACT

A relay server includes: a communication device communicable with a recording apparatus, a conversion server which converts image data, and a storage server which stores the image data; and a controller. The controller is configured to: acquire, from the recording apparatus, a storing instruction for storing converted image data into the storage server, the converted image data being image data converted by the conversion server; acquire account identification information for identifying an account of the recording apparatus in the storage server, from the recording apparatus via the communication device; acquire the converted image data from the conversion server via the communication device; and transmit the acquired converted image data and the acquired account identification information to the storage server via the communication device in a state in which the acquired converted image data and the acquired account identification information are associated with each other.

26 Claims, 12 Drawing Sheets

(52) U.S. Cl.
CPC .......... *G06F 3/1222* (2013.01); *G06F 3/1238* (2013.01); *G06F 3/1267* (2013.01); *G06F 3/1285* (2013.01); *G06F 3/1288* (2013.01); *G06F 3/1297* (2013.01); *H04L 63/083* (2013.01)

(56) References Cited

U.S. PATENT DOCUMENTS

| | | |
|---|---|---|
| 2011/0149333 A1 | 6/2011 | Hong |
| 2012/0081743 A1 | 4/2012 | Watanabe et al. |
| 2012/0120439 A1 | 5/2012 | Minagawa |
| 2013/0077117 A1 | 3/2013 | Kobayashi |
| 2014/0362402 A1 | 12/2014 | Tsuboi |
| 2015/0180933 A1 | 6/2015 | Spracklen et al. |
| 2016/0065683 A1 | 3/2016 | Saito |

RELAY SERVER, STORAGE MEDIUM STORING INSTRUCTIONS EXECUTABLE BY THE RELAY SERVER, AND CONTROL METHOD

CROSS REFERENCE TO RELATED APPLICATION

The present application is a continuation of U.S. patent application Ser. No. 14/661,954, filed Mar. 18, 2015, and further claims priority from Japanese Patent Application No. 2014-055967, which was filed on Mar. 19, 2014, the entire contents of both of which are incorporated by reference in their entirety.

BACKGROUND

Technical Field

The present invention relates to (i) a relay server communicable with a printer, a conversion server for converting image data, and a storage server for storing the image data, (ii) a storage medium storing a plurality of instructions executable by a processor of the relay server, and (iii) a control method implementable by the processor of the relay server.

Description of the Related Art

There is known a communication system including a printer, a conversion server for converting image data, and a storage server for storing the image data. In such a communication system, the image data stored in the storage server is converted by the conversion server, and the converted image data is transmitted to the printer, whereby the printer can print an image based on the converted image data.

SUMMARY

The above-described communication system allows the printer to print images based on various kinds of image data. In the case where the printer has a small amount of storage, however, the printer cannot store the converted image data. Accordingly, a user inconveniently needs to prepare an external memory such as a USB memory to perform printing again using the converted data. Accordingly, an aspect of the disclosure relates to establishment of a convenient communication system.

In one aspect of the disclosure, a relay server includes: a communication device communicable with (a) a recording apparatus, (b) a conversion server configured to convert image data, and (c) a storage server configured to store the image data; and a controller. The controller is configured to: acquire, from the recording apparatus, a storing instruction for storing converted image data into the storage server, the converted image data being image data converted by the conversion server; when the storing instruction is acquired, acquire account identification information from the recording apparatus via the communication device, the account identification information being for identifying an account of the recording apparatus in the storage server; acquire the converted image data from the conversion server via the communication device; and transmit the acquired converted image data and the acquired account identification information to the storage server via the communication device in a state in which the acquired converted image data and the acquired account identification information are associated with each other.

In another aspect of the disclosure, a storage medium stores a plurality of instructions executable by a processor of a relay server. The relay server includes a communication device communicable with (a) a recording apparatus, (b) a conversion server configured to convert image data, and (c) a storage server configured to store the image data. The plurality of instructions, when executed by the processor of the relay server, cause the relay server to: acquire, from the recording apparatus, a storing instruction for storing converted image data into the storage server, the converted image data being image data converted by the conversion server; when the storing instruction is acquired, acquire account identification information from the recording apparatus via the communication device, the account identification information being for identifying an account of the recording apparatus in the storage server; acquire the converted image data from the conversion server via the communication device; and transmit the acquired converted image data and the acquired account identification information to the storage server via the communication device in a state in which the acquired converted image data and the acquired account identification information are associated with each other.

Another aspect of the disclosure provides a control method implementable by a processor of a relay server. The relay server includes a communication device communicable with (a) a recording apparatus, (b) a conversion server configured to convert image data, and (c) a storage server configured to store the image data. The control method, when implemented by the processor of the relay server, causes the relay server to: acquire, from the recording apparatus, a storing instruction for storing converted image data into the storage server, the converted image data being image data converted by the conversion server; when the storing instruction is acquired, acquire account identification information from the recording apparatus via the communication device, the account identification information being for identifying an account of the recording apparatus in the storage server; acquire the converted image data from the conversion server via the communication device; and transmit the acquired converted image data and the acquired account identification information to the storage server via the communication device in a state in which the acquired converted image data and the acquired account identification information are associated with each other.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

DETAILED DESCRIPTION OF THE EMBODIMENT

Configuration of Communication System

Figure 1:
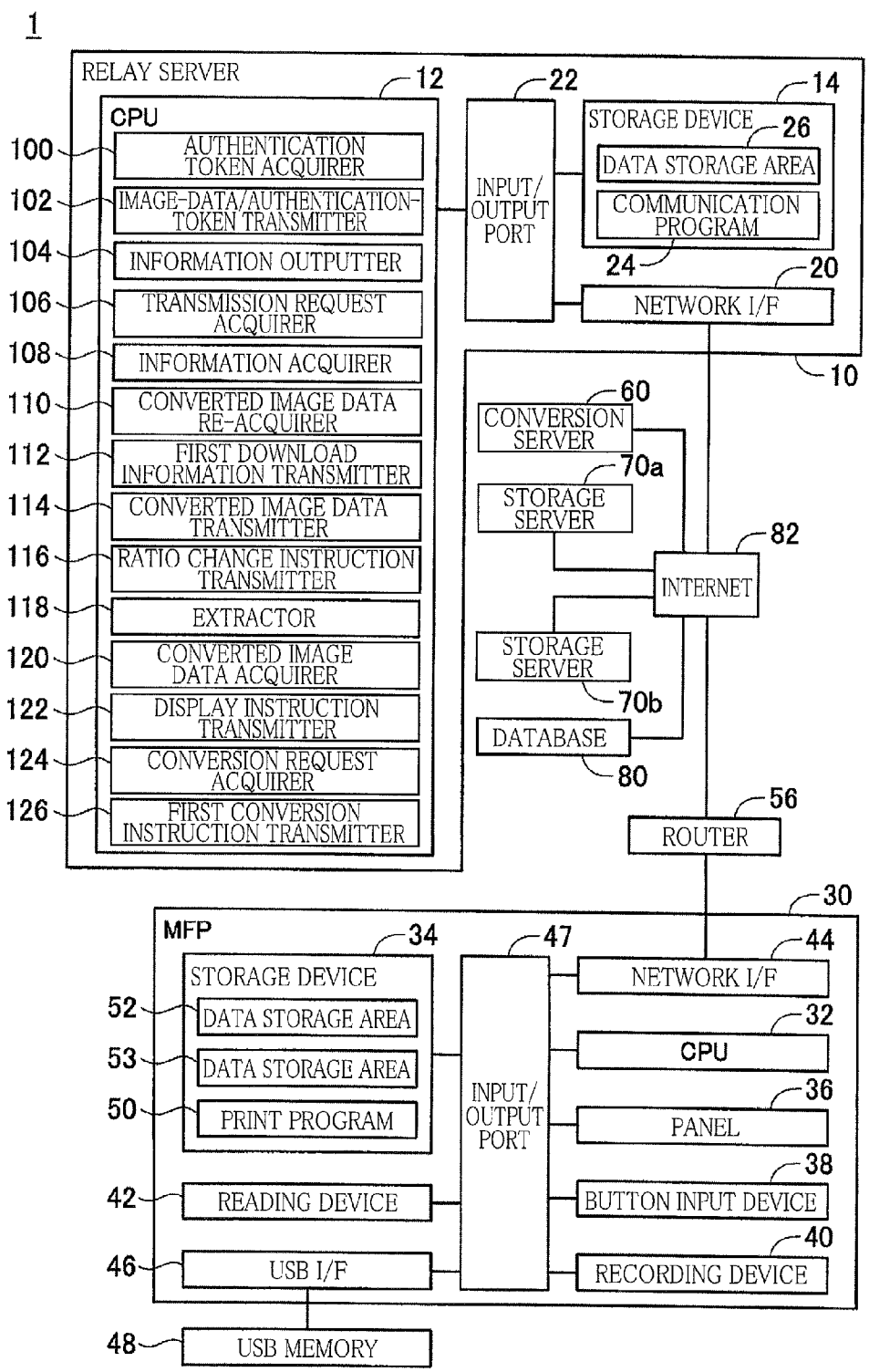
FIG. 1 is a block diagram illustrating a communication system.

FIG. 1 illustrates a communication system 1 according to one embodiment. The communication system 1 includes a relay server 10, an MFP (Multi-function Peripheral) 30 as one example of a recording apparatus, a conversion server 60, storage servers 70a, 70b, and a database 80 as one example of a memory. Data can be transferred between the relay server 10, the MFP 30, the conversion server 60, the storage servers 70a, 70b, and the database 80 over the Internet 82. The storage servers 70a, 70b may be hereinafter simply referred to as "storage server 70" in the case where the storage servers 70a, 70b do not need to be distinguished from each other.

There will be next explained a configuration of the relay server 10. The relay server 10 includes a CPU (Central Processing Unit) 12 as one example of a controller and a computer, a storage device 14, and a network interface 20 as one example of a communication device. These devices are communicable with each other via an input/output port 22.

The network interface 20 communicates with external devices over the Internet 82. The network interface 20 is connected to the MFP 30, the conversion server 60, the storage servers 70a, 70b, and the database 80 over the Internet 82. With this configuration, the relay server 10 can transmit and receive various kinds of data to and from the MFP 30, the conversion server 60, the storage servers 70a, 70b, and the database 80.

The CPU 12 executes processings according to a communication program 24 stored in the storage device 14. When executed, the communication program 24 causes the CPU 12 to execute data communication with the MFP 30, the conversion server 60, the storage server 70, and the database 80. Hereinafter, the CPU 12 that executes programs such as the communication program 24 may be simply referred to as the name of the program. For example, the wording "the communication program 24 executes" may mean "the CPU 12 that executes the communication program 24 executes".

The storage device 14 has a data storage area 26. The data storage area 26 is an area for storing: image data acquired from, e.g., the conversion server 60; and data required for execution of the communication program 24. It is noted that the storage device 14 is constituted by combination of a RAM (Random Access Memory), a ROM (Read Only Memory), a flash memory, a HDD (hard disk), a buffer provided in the CPU 12, and other similar devices.

There will be next explained a configuration of the MFP 30. The MFP 30 includes a CPU 32, a storage device 34, a panel 36 as one example of a display, a button input device 38, a recording device 40, a reading device 42, a network interface 44, and a USB interface 46. These devices are communicable with each other via an input/output port 47. The recording device 40 is an ink-jet head, for example. The CPU 32 outputs drive signals to the recording device 40. In the case where the recording device 40 is the ink-jet head, the recording device 40 ejects ink from nozzles based on input drive signals.

The panel 36 has a display surface for displaying various kinds of functions of the MFP 30. The button input device 38 is provided with keys or buttons for executing the various functions of the MFP 30. The button input device 38 may be a touch panel provided integrally with the panel 36. The recording device 40 performs printing. The reading device 42 scans a document to create image data.

The network interface 44 is connected to the Internet 82 via a router 56. The network interface 44 communicates with external devices over the Internet 82. The network interface 44 is connected to the relay server 10, the conversion server 60, the storage servers 70a, 70b, and the database 80 over the Internet 82. With this configuration, the MFP 30 can transmit and receive various kinds of data to and from the relay server 10, the conversion server 60, the storage servers 70a, 70b, and the database 80.

When having received a print job containing image data and an instruction for printing the image data, the MFP 30 converts the image data to a drive signal which can be input to the recording device 40. The print instruction contains setting values respectively for a plurality of print setting items. Examples of the print setting items include an image size, a sheet size, a "color/monochrome", and an "Nin1". The image size designates a size of an image to be recorded on a sheet. The image size is represented as a standard of the sheet. For example, an A4 size indicates an image of a size matched or fitted to the A4 sheet, and a postcard size indicates an image of a size matched to the postcard sheet.

The sheet size designates a standard of a sheet on which an image is to be recorded. When having received a print job, the CPU 32 converts image data contained in the print job to a drive signal such that an image based on the image data is to be recorded by the ink-jet head on a sheet of a designated image size. However, limitation of firmware of the MFP 30 does not allow the image data to be converted into a drive signal for recording of an image having a postcard size as an image size. To solve this problem, in the present embodiment, the MFP 30 uses special image data when recording an image on the sheet of the postcard size.

That is, the MFP 30 uses image data in a form in which pixel values for representing a target image are contained in an area corresponding to a ratio of the size of the postcard-size image to the size of an image of an image size (A4 in this explanation) larger than the postcard size, and the other area has no pixel values (that is, the other area is empty in pixel values). This form may be hereinafter referred to as "form for printing of postcard". The CPU 12 converts the above-described image data to drive data for recording of an image of the A4 size as the image size and inputs the drive data to the recording device 40 to print the data. As a result, an image of a matched size can be recorded on the sheet of the postcard size. In the conversion server 60, in the present embodiment, normal image data can be converted into image data in the form for printing of the postcard.

Also, the CPU 32 executes processings according to a print program 50 stored in the storage device 34. The print program 50 is a program for execution of printing using the communication system 1. The storage device 34 has data storage areas 52, 53. The data storage area 52 is an area for storing image data and the like used in printing. The data storage area 52 is constituted by a RAM and used for temporal storing. The data storage area 53 is constituted by a non-transitory memory such as a flash memory. The data storage area 53 allows each of the servers 70a, 70b to input settings to the data storage area 53 in advance and thereby stores account information (which will be described in detail). A USB memory 48 can be connected to the USB interface 46. That is, the MFP 30 can use the USB memory 48 to store image data and the like for a long time.

Printing by MFP Using Communication System

Figure 2:
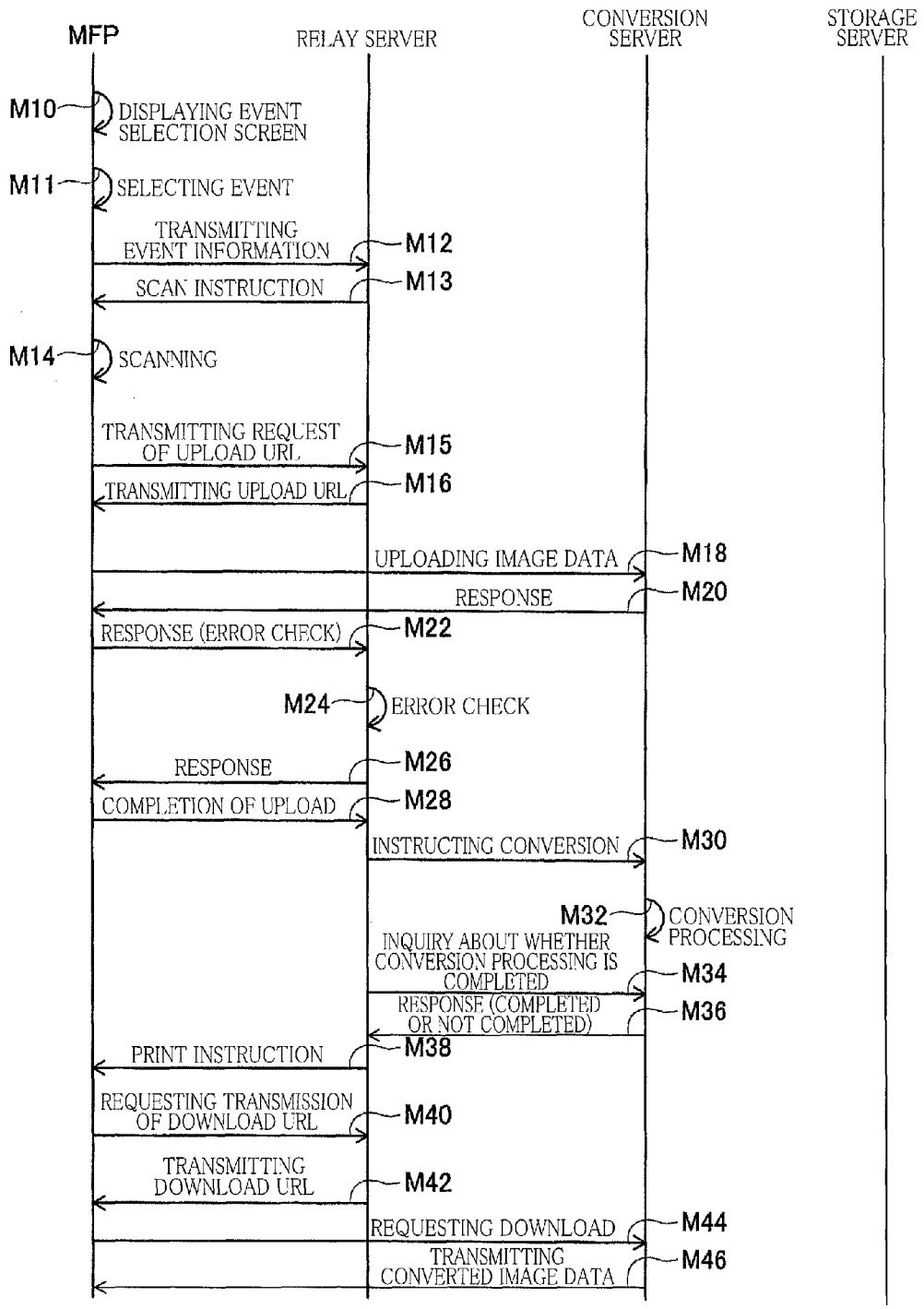
FIG. 2 is a sequence diagram illustrating processings in the communication system.

In the communication system 1, the image data obtained by scanning by the MFP 30 is converted in the conversion server 60, and the MFP 30 prints an image based on the image data for which the conversion processing has been executed (noted that such image data may be hereinafter referred to as "converted image data"). There will be next explained, with reference to FIG. 2, the conversion processing and the print processing for image data in the communication system 1.

In the communication system 1, first, the MFP 30 at M10 controls the panel 36 to display an event selection screen thereon. At M11, a user selects an event. The event indicates a type of use of a document to be printed. Examples of names of events (event names) include a NewYearCard and a Business. Image data classified into the NewYearCard is used for printing the image data on the New Year Card. Image data classified into the Business is used for printing the image data on the business document. It is noted that the size of a sheet on which an image is to be recorded is determined in advance according to the event. For example, when the NewYearCard is selected, the sheet size is the postcard size, and when the Business is selected, the sheet size is the A4 size.

When the event is selected, the information indicating the selected event is at M12 transmitted from the MFP 30 to the relay server 10. The relay server 10 at M13 transmits a scan instruction to the MFP 30. According to the received scan instruction, the MFP 30 at M14 executes a scan processing for scanning an image which is used for creation of an image to be printed. The MFP 30 at M15 sends the relay server 10 a request of transmission of a URL (Uniform Resource Locator) which is used for an upload of image data. Based on the received request of transmission of the upload URL, the relay server 10 at M16 transmits the upload URL to the MFP 30. It is noted that the upload URL is a URL indicating the conversion server 60 as a destination of transmission, and this upload URL is stored in the data storage area 26 of the relay server 10.

When having received the upload URL, the MFP 30 at M18 uses the upload URL to upload the image data created by the scanning, to the conversion server 60. The conversion server 60 at M20 sends the MFP 30 a response to the upload of the image data. The MFP 30 at M22 sends the relay server 10 the response transmitted from the conversion server 60. When having received the response from the conversion server 60, the relay server 10 at M24 checks a result of the upload based on the response transmitted from the conversion server 60. The relay server 10 at M26 transmits the result of the check to the MFP 30. These operations are performed because the MFP 30 cannot check the response transmitted from the conversion server 60.

When having received the result of the check from the relay server 10, the MFP 30 at M28 sends the relay server 10 a notification about completion of the upload. When having received the notification about the completion of the upload, the relay server 10 at M30 sends the conversion server 60 an instruction for converting the image data. It is noted that the relay server 10 identifies a sheet size based on the event information transmitted at M12, and in the case where the identified sheet size is the postcard size, the relay server 10 transmits this information to the conversion server 60 with the instruction of conversion. Based on the received instruction for converting the image data, the conversion server 60 at M32 executes a conversion processing for converting the image data to the converted image data. That is, the conversion server 60 converts the image data uploaded at M18, to the converted image data. It is noted that in the case where the sheet size is the size of the postcard, the conversion server 60 creates both of normal converted image data and the converted image data in the form for printing of the postcard. On the other hand, in the case where the sheet size is a size different from the size of the postcard such as A4, the conversion server 60 creates only the normal converted image data.

The relay server 10 at M34 sends the conversion server 60 an inquiry about whether the conversion processing for the image data is completed or not. When the conversion processing for the image data is completed, the conversion server 60 at M36 sends the relay server 10 a response indicating the completion of the conversion processing. When the conversion processing for the image data is not completed, the conversion server 60 at M36 sends the relay server 10 a response indicating that the conversion processing is not completed. When the response indicating the completion of the conversion processing is received from the conversion server 60, the relay server 10 at M38 transmits a print instruction to the MFP 30.

Figure 3:
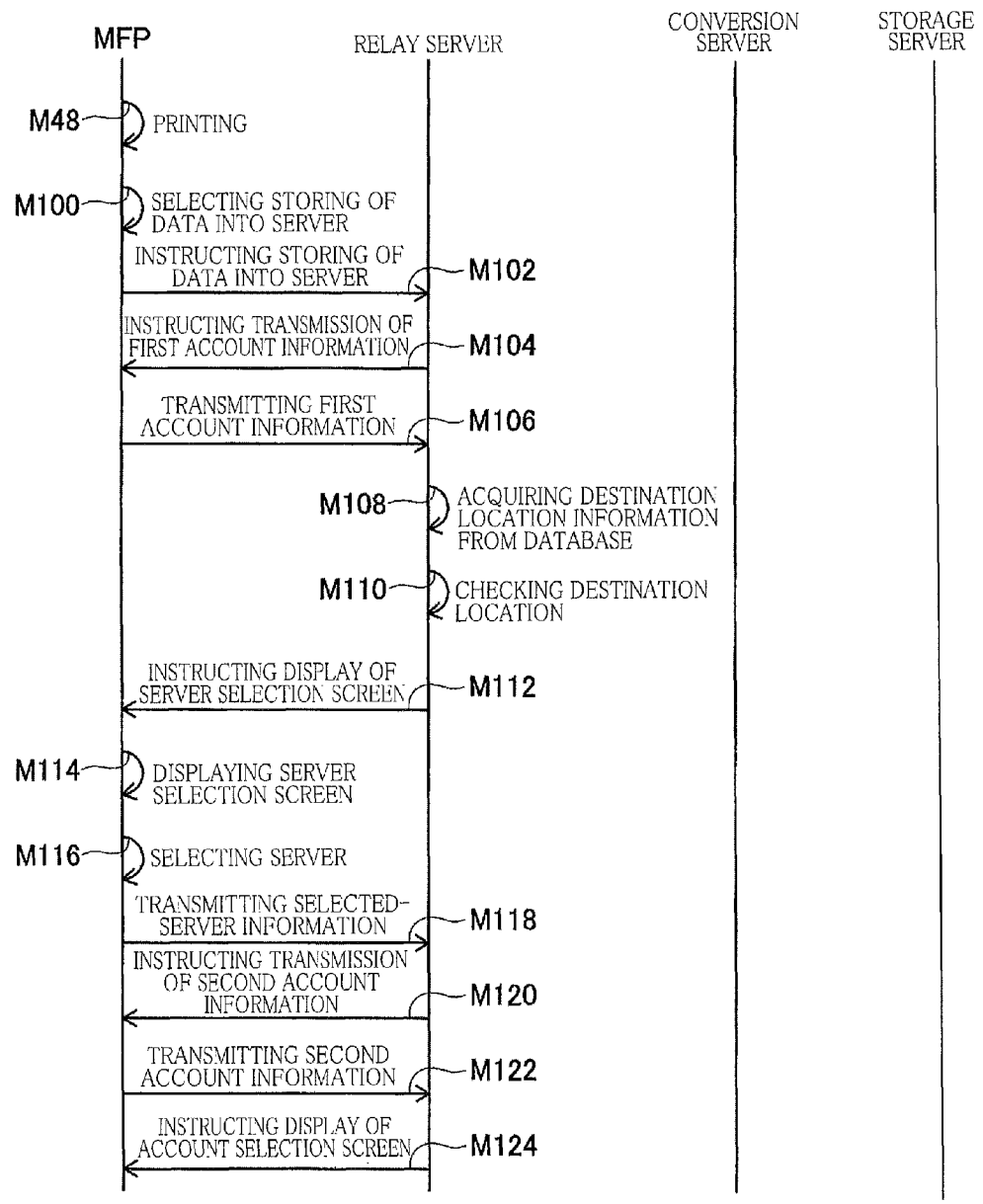
FIG. 3 is a sequence diagram illustrating processings in the communication system.

When having received the print instruction, the MFP 30 at M40 sends the relay server 10 a request of transmission of a URL which is for downloading converted image data for printing from the conversion server 60. When having received the request of transmission of the download URL, the relay server 10 at M42 transmits the download URL to the MFP 30. It is noted that the download URL transmitted to the MFP 30 is based on the sheet size. That is, in the case where the sheet size is the size of the postcard, the relay server 10 transmits the download URL of the converted image data in the form for printing of the postcard, and in the case where the sheet size is a size different from the size of the postcard such as A4, there is only one converted image data, and accordingly the relay server 10 transmits the download URL of the converted image data. The MFP 30 at M44 uses the download URL to request a download of the converted image data converted in the conversion server 60. When having received the request of the download, the conversion server 60 at M46 transmits the converted image data to the MFP 30. As illustrated in FIG. 3, the MFP 30 at M48 executes a print processing for the image based on the received converted image data.

Storing of Converted Image Data by Storage Server

Figure 4:
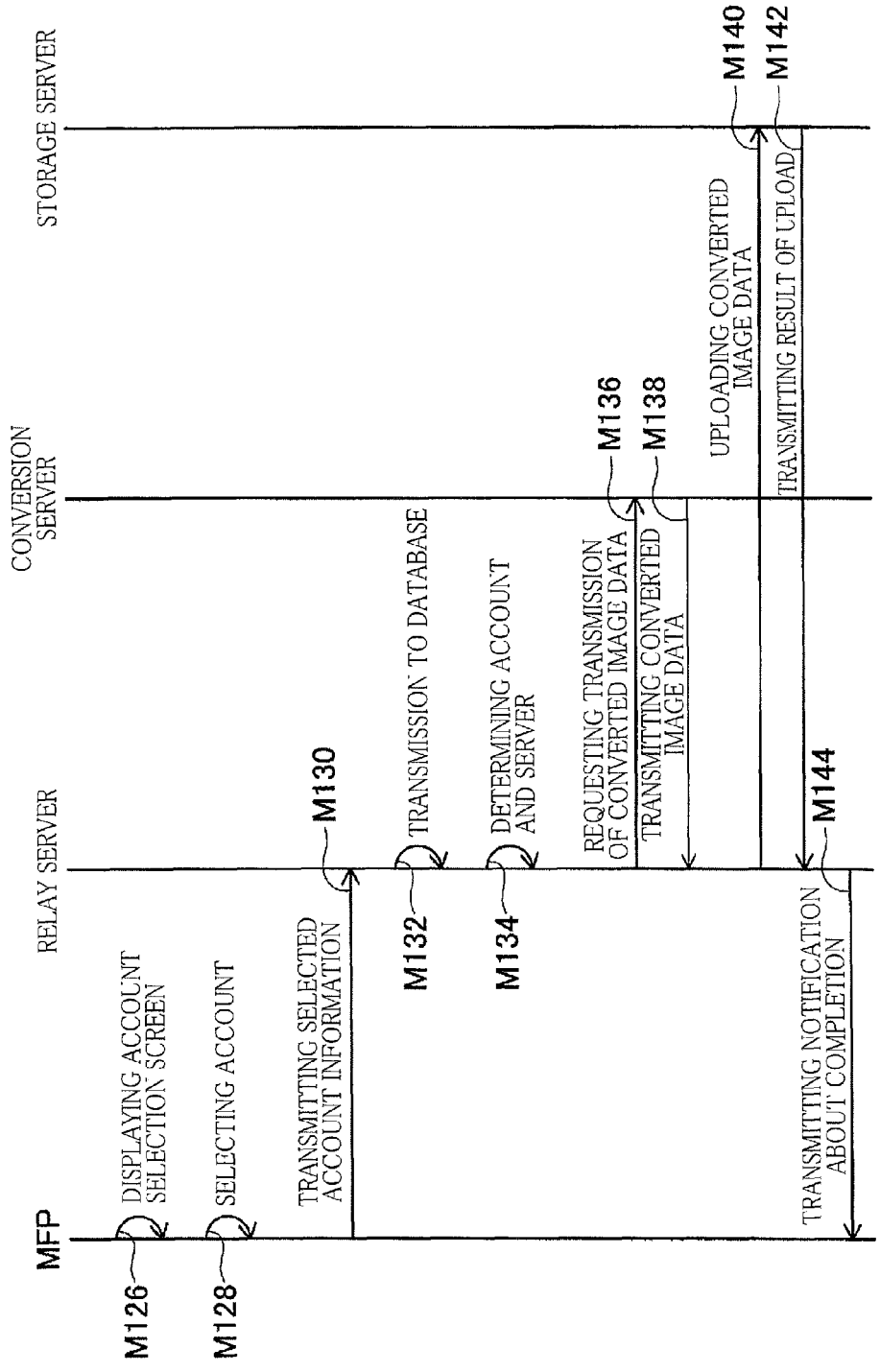
FIG. 4 is a sequence diagram illustrating processings in the communication system.

In the communication system 1, as described above, the image data obtained by scanning by the MFP 30 is converted in the conversion server 60, and the MFP 30 executes the print processing for the image based on the converted image data. However, since the data storage area 52 of the MFP 30 can only temporarily store the data as described above, the converted image data cannot be stored in the data storage area 52 for re-use in the case where no USB memory is connected to the USB interface 46. That is, in the case where the converted image data converted in the conversion server 60 is to be printed later, for example, the user needs to prepare a USB memory, resulting in reduced usability. To solve this problem, in this communication system 1, the converted image data converted in the conversion server 60 is stored into the storage server 70. There will be next explained, with reference to FIGS. 3 and 4, a processing for storing the converted image data into the storage server 70 in the communication system 1.

First, a user at M100 operates a button provided on the MFP 30 to store the converted image data into the storage server 70. In response to the operation on the button, the MFP 30 at M102 sends the relay server 10 an instruction for storing the converted image data into the storage server 70. When having received the instruction transmitted at M102, the relay server 10 at M104 sends the MFP 30 an instruction for transmitting all the stored sets of account information (as one example of an instruction for transmitting first account information). The MFP 30 at M106 sends the relay server 10 all the stored sets of account information stored in the data storage area 53. It is noted that the account information contains: an authentication token; an account display name for identifying the authentication token; and identification information for identifying the storage server 70 as a destination location of the converted image data (i.e., a location or a server into which the converted image data is to be stored). The authentication token is information for identifying an account and issued by the storage server 70 for each account. When having received a request containing the authentication token, the storage server 70 can identify that the request is transmitted from an account which is managed by the storage server 70. The account display name is a name of an account for the storage server 70 which is used when the name of the account is displayed on the MFP 30. This account display name is registered in advance in the MFP 30 by a user operation. It is noted that an account name used in the storage server 70 may be used as the account display name.

Figure 5:
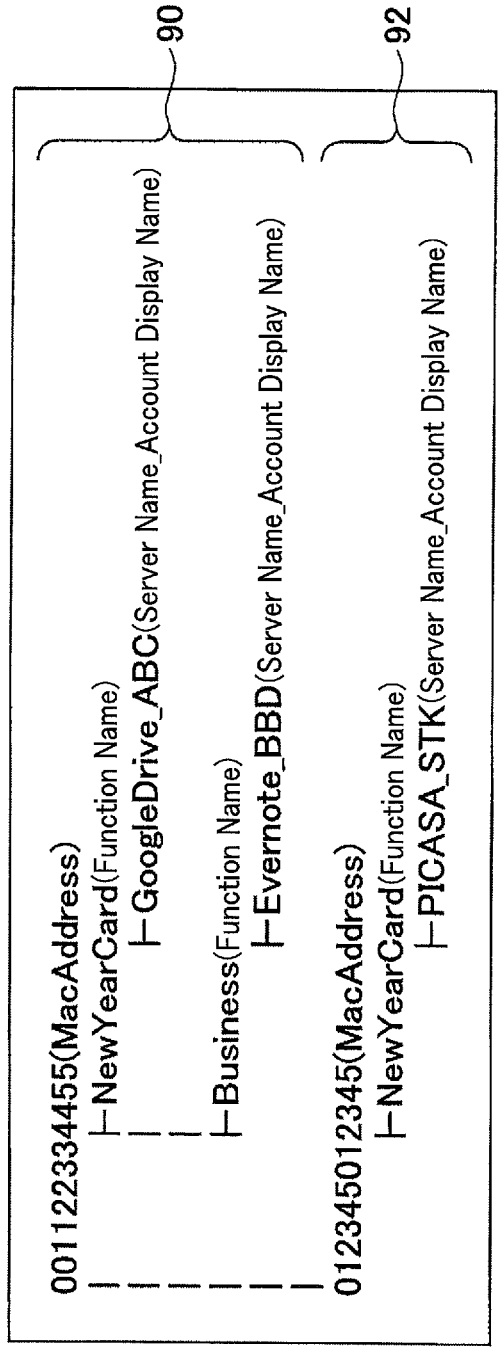
FIG. 5 is a view illustrating information stored in the database for each Mac address.

When having received the account information, the relay server 10 at M108 acquires sets of destination location information 90, 92 illustrated in FIG. 5 from the database 80. The sets of destination location information 90, 92 are stored in the database 80 in units of Mac addresses of respective MFPs 30. For each event name (as one example of determination information) indicating the event selected the MFP 30 at the time point when an image to be stored into the storage server 70 as the destination location is created, a server name (as one example of storage-server identification information) indicating the storage server 70 into which image data is to be stored, and an account display name corresponding to the account in the storage server 70 are stored in association with each other as each of the sets of destination location information 90, 92.

In the example illustrated in FIG. 5, the destination location information 90 on the MFP 30 which is assigned with "0011223344455" as its Mac address contains "GoogleDrive" as the server name and "ABC" as the account display name for the selected event name (New-YearCard in this example). That is, this destination location information 90 indicates that image data to be created by the MFP 30 for the New Year Card is to be stored into the Google Drive as the storage server 70 and that the authentication token to be used for communication with the storage server 70 is for an account whose account display name is "ABC". Thus, the account display name and the server name indicating the storage server 70 as a destination location of the converted image data created by each of the MFP 30 can be acquired from a corresponding one of the destination location information 90, 92.

When having received the destination location information 90, 92, the relay server 10 at M110 checks whether or not the acquired destination location information contains the combination of the server name and the account display name in the account information acquired from the MFP 30, in association with the selected event name (the New-YearCard in this example). When the destination location information does not contain the combination of the server name and the account display name in the account information in association with the selected event name, the destination location of the converted image data is not set by the event name selected in the MFP 30, and accordingly the account display name and the server name of the storage server 70 as the destination location of the converted image data are set.

Specifically, the relay server 10 at M112 sends the MFP 30 an instruction for displaying a screen for the user to select the server name of the storage server 70 as the destination location of the converted image data. When having received the display instruction, the MFP 30 at M114 controls the panel 36 to display a screen for the user to select the server name of the storage server 70 as the destination location. The screen for selection of the server name contains server names of a plurality of the storage servers 70, in each of which the converted image data can be stored. A desired one of the server names is at M116 selected by a user operation. The MFP 30 at M118 sends the relay server 10 identification information on the server name selected by the user operation.

The relay server 10 at M120 resends the MFP 30 an instruction for transmitting all the sets of account information. The MFP 30 at M122 resends the relay server 10 all the sets of account information stored in the data storage area 53. The relay server 10 at M124 extracts, from the account information received at M122, account display names respectively corresponding to accounts for a storage server 70 indicated by the identification information received at M118 and sends the MFP 30 an instruction for displaying a screen for the user to select one of the extracted account display names. When having received the display instruction, the MFP 30 at M126 controls the panel 36 to display a screen for the user to select the account display name. The user at M128 selects a desired one of the account display names displayed on the panel 36. The MFP 30 at M130 sends the relay server 10 the account display name selected by the user operation.

When having received the account display name, the relay server 10 at M132 sends the database 80 the received account display name, the server name transmitted at M118, and the event name transmitted at M12. As a result, for the selected event name, a new combination of the account display name and the server name is stored in the database 80 as a portion of the destination location information 90, 92. The relay server 10 at M134 determines the storage server 70 as the destination of transmission of the converted image data and the account in the storage server 70, based on the received account display name and the server name. It is noted that in the case where it is determined at M110 that the destination location information 90, 92 contain the combination of the combination of the server name and the account display name contained in the account information transmitted at M106, the relay server 10 determines, based on the information, the storage server 70 as the destination of transmission of the converted image data and the account in the storage server 70 (M134). In this case, the processings at M112-M132 are not performed. In the case where the relay server 10 thereafter communicates with the storage server 70, the relay server 10 uses the authentication token contained in the account information received from the MFP 30.

The relay server 10 at M136 sends the conversion server 60 a request of transmission of the converted image data.

When having received the request of transmission of the converted image data, the conversion server 60 at M138 transmits the converted image data to the relay server 10. The relay server 10 at M140 accesses the determined storage server 70 using the authentication token to upload the converted image data to the storage server 70. This operation is performed for the following reason: if the converted image data in the form for printing of the postcard is uploaded, when the converted image data is acquired by a certain information processing terminal from the storage server 70, the information processing terminal unfortunately displays an image containing white areas on its edge portions. The storage server 70 at M142 responds to the relay server 10 in response to the upload of the converted image data. The relay server 10 at M144 sends the MFP 30 a notification about a completion of the upload. As a result, the processing for storing the converted image data into the storage server 70 is finished. It is noted that, in the processing at M140, the converted image data is uploaded to the storage server 70 based on the authentication token as the identification account of the MFP 30, and accordingly the authentication token of the MFP 30 and the converted image data are stored into the storage server 70 in association with each other.

Utilization of Converted Image Data

Figure 6:
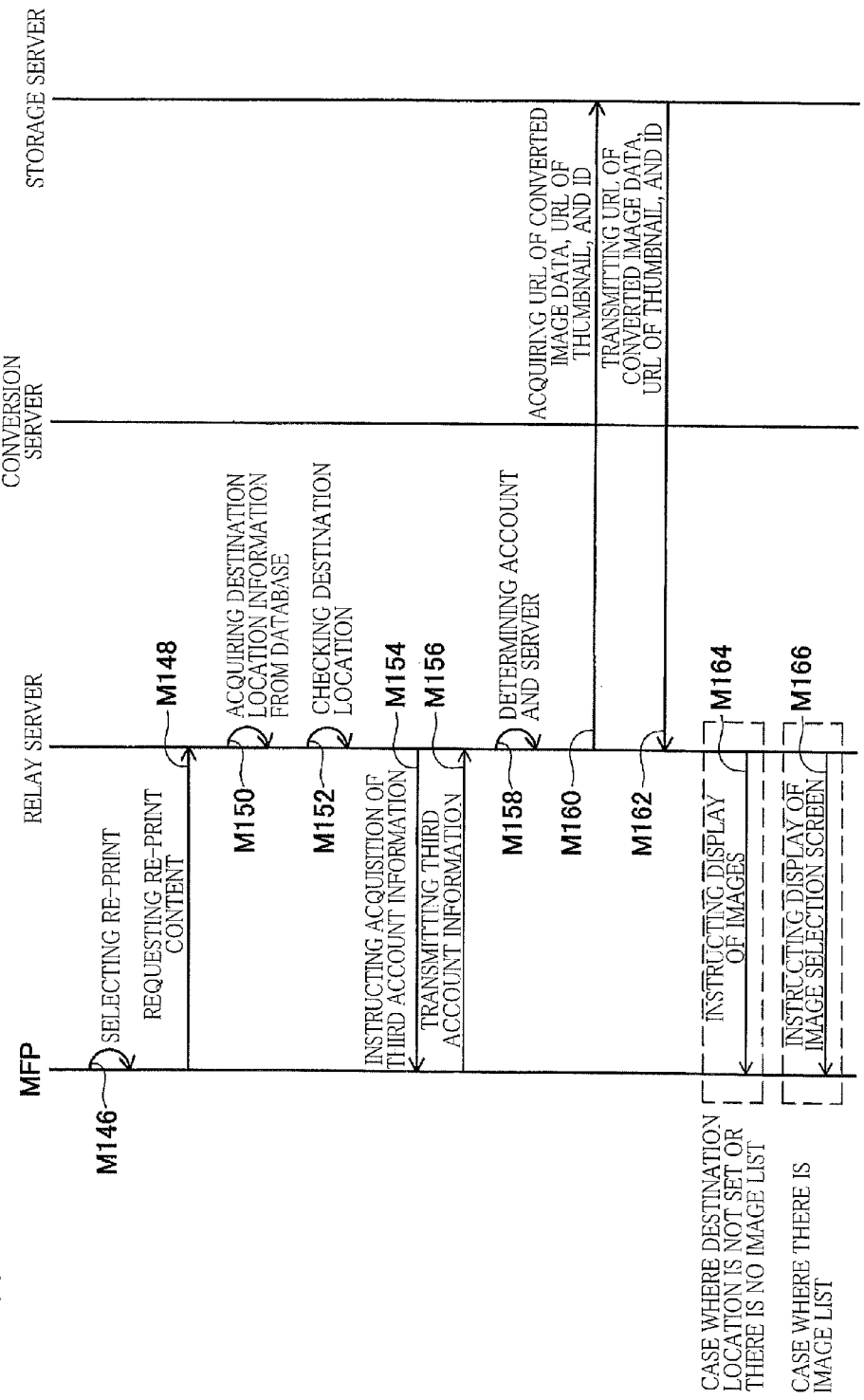
FIG. 6 is a sequence diagram illustrating processings in the communication system.
Figure 7:
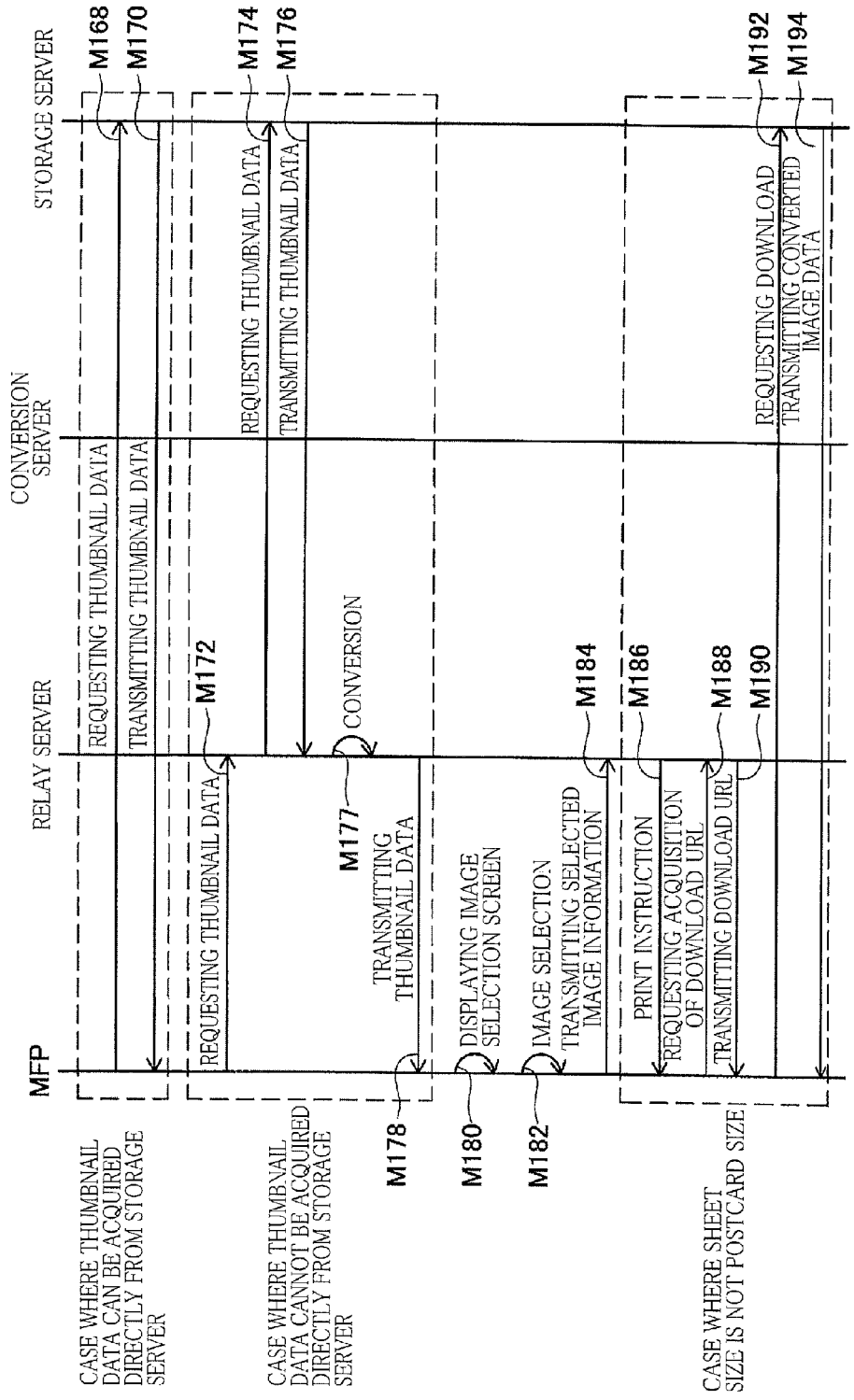
FIG. 7 is a sequence diagram illustrating processings in the communication system.
Figure 8:
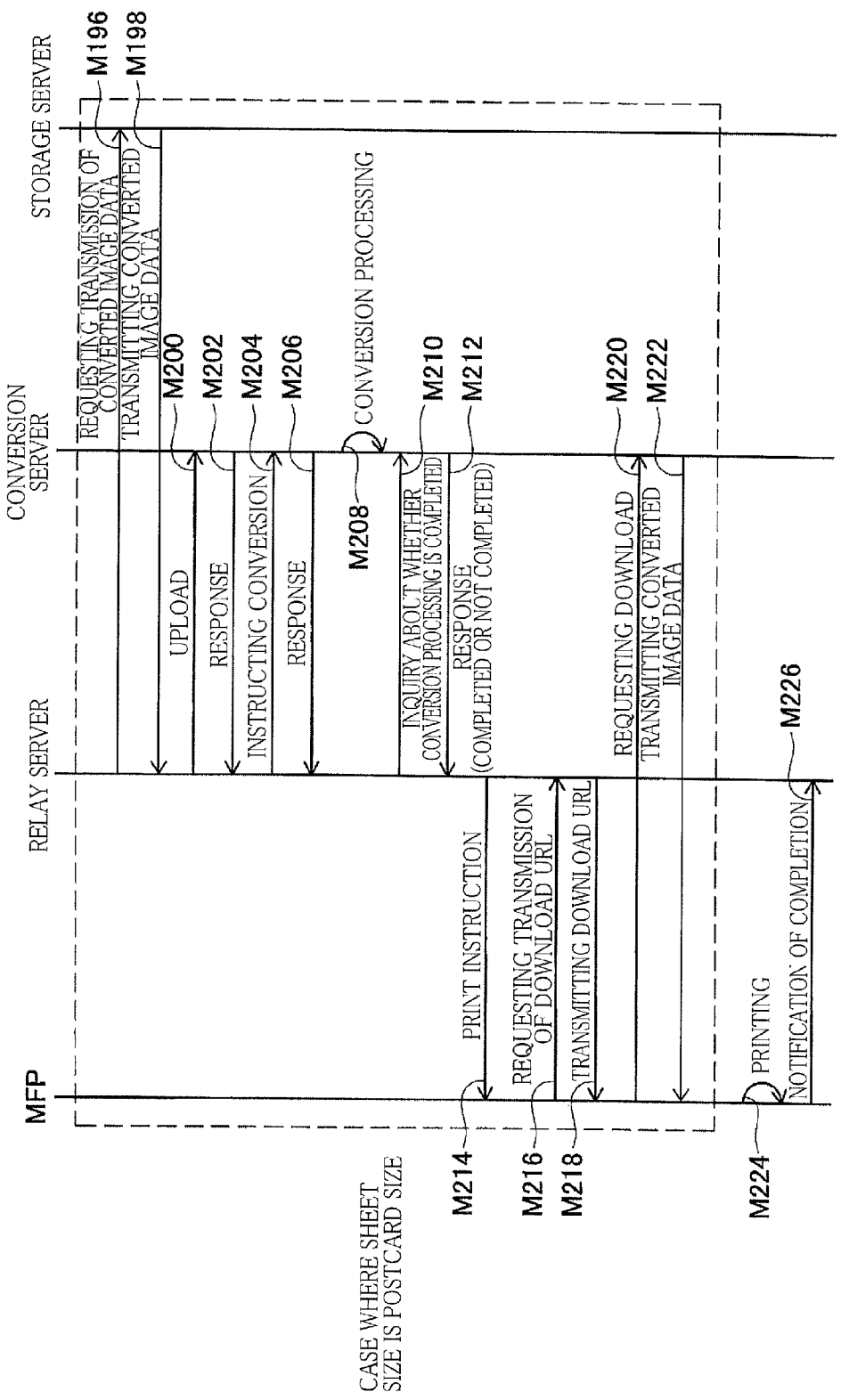
FIG. 8 is a sequence diagram illustrating processings in the communication system.
Figure 9:
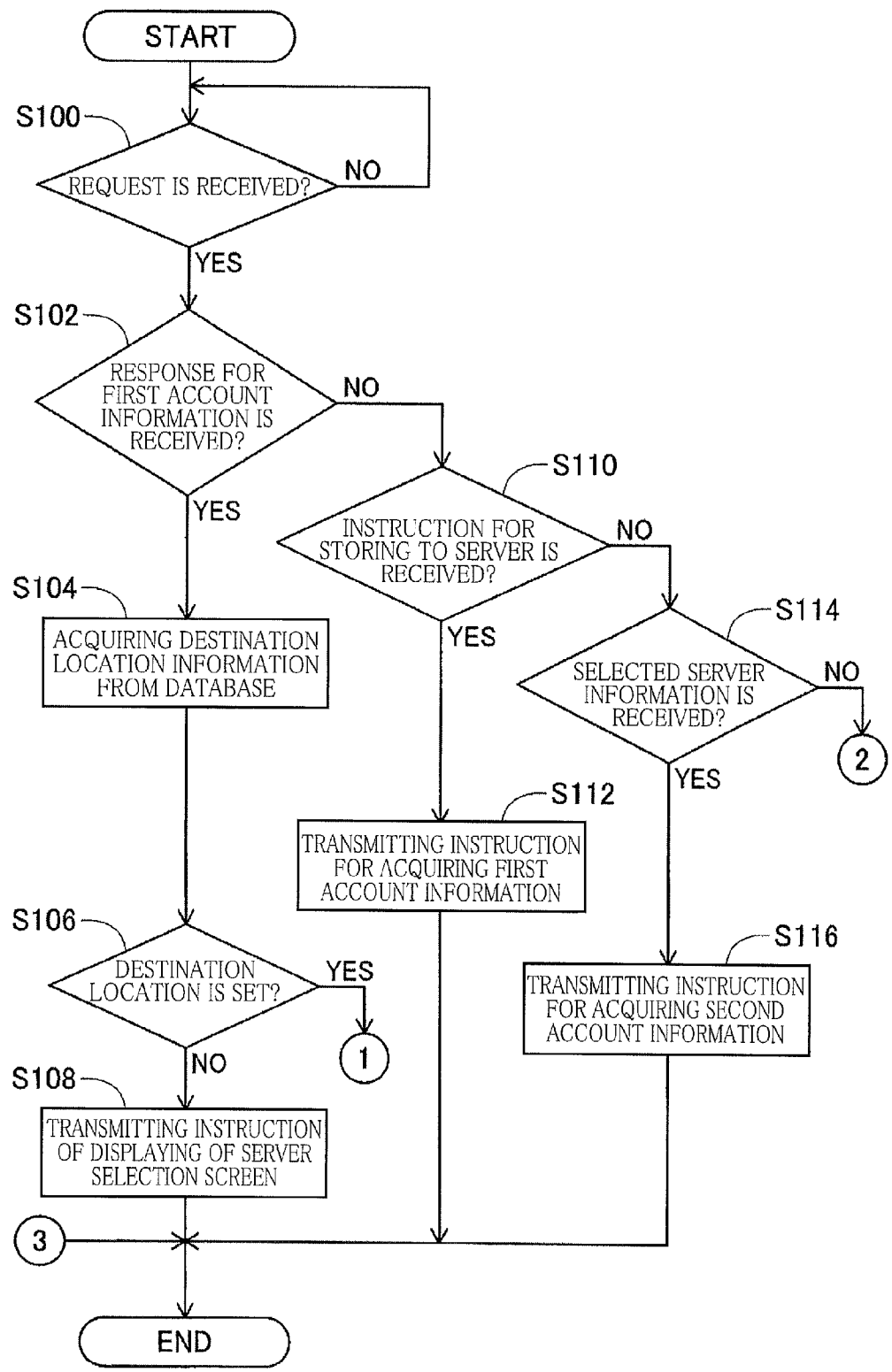
FIG. 9 is a flow chart illustrating processings executed by a relay server.
Figure 10:
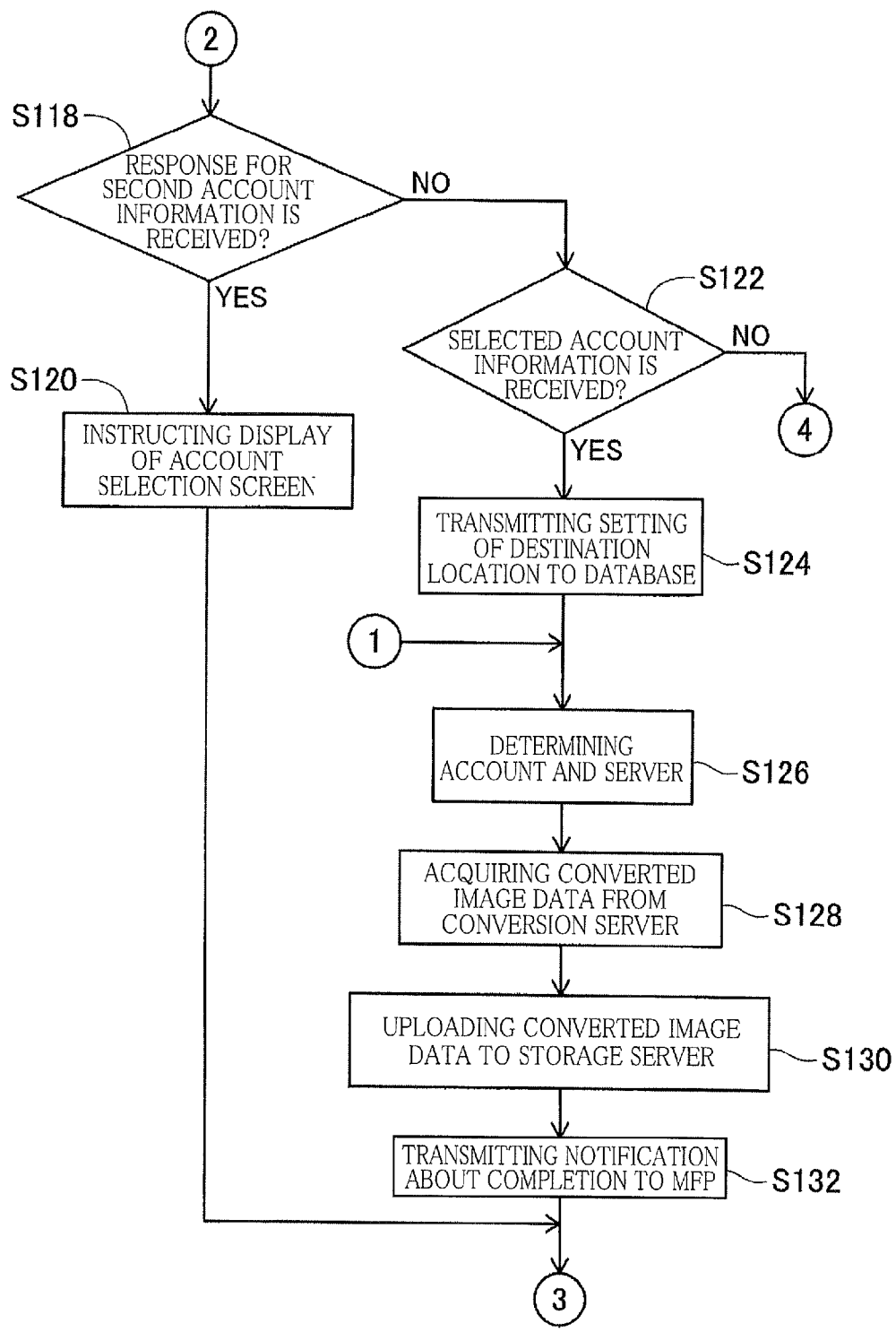
FIG. 10 is a flow chart illustrating processings executed by the relay server.
Figure 11:
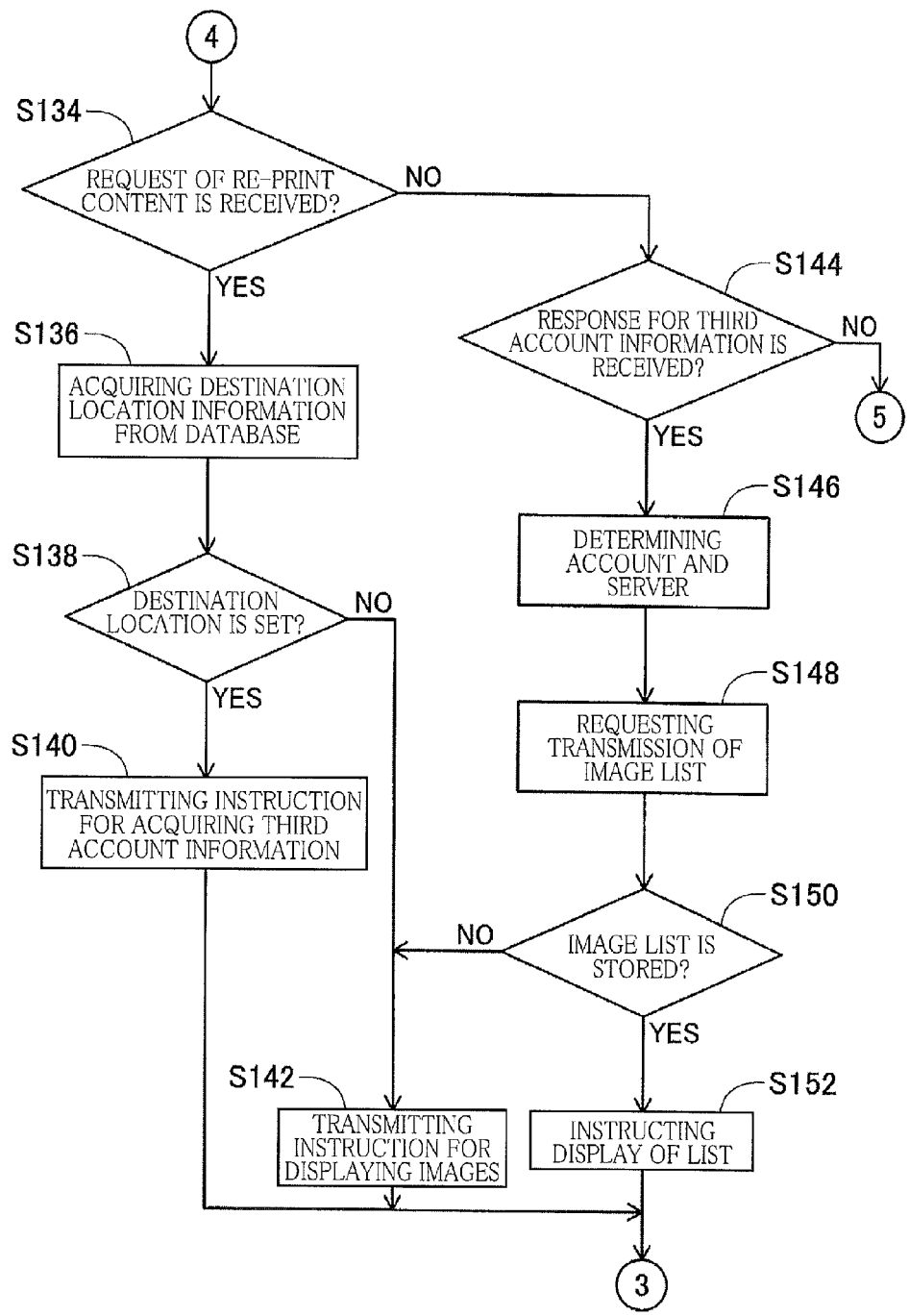
FIG. 11 is a flow chart illustrating processings executed by the relay server.
Figure 12:
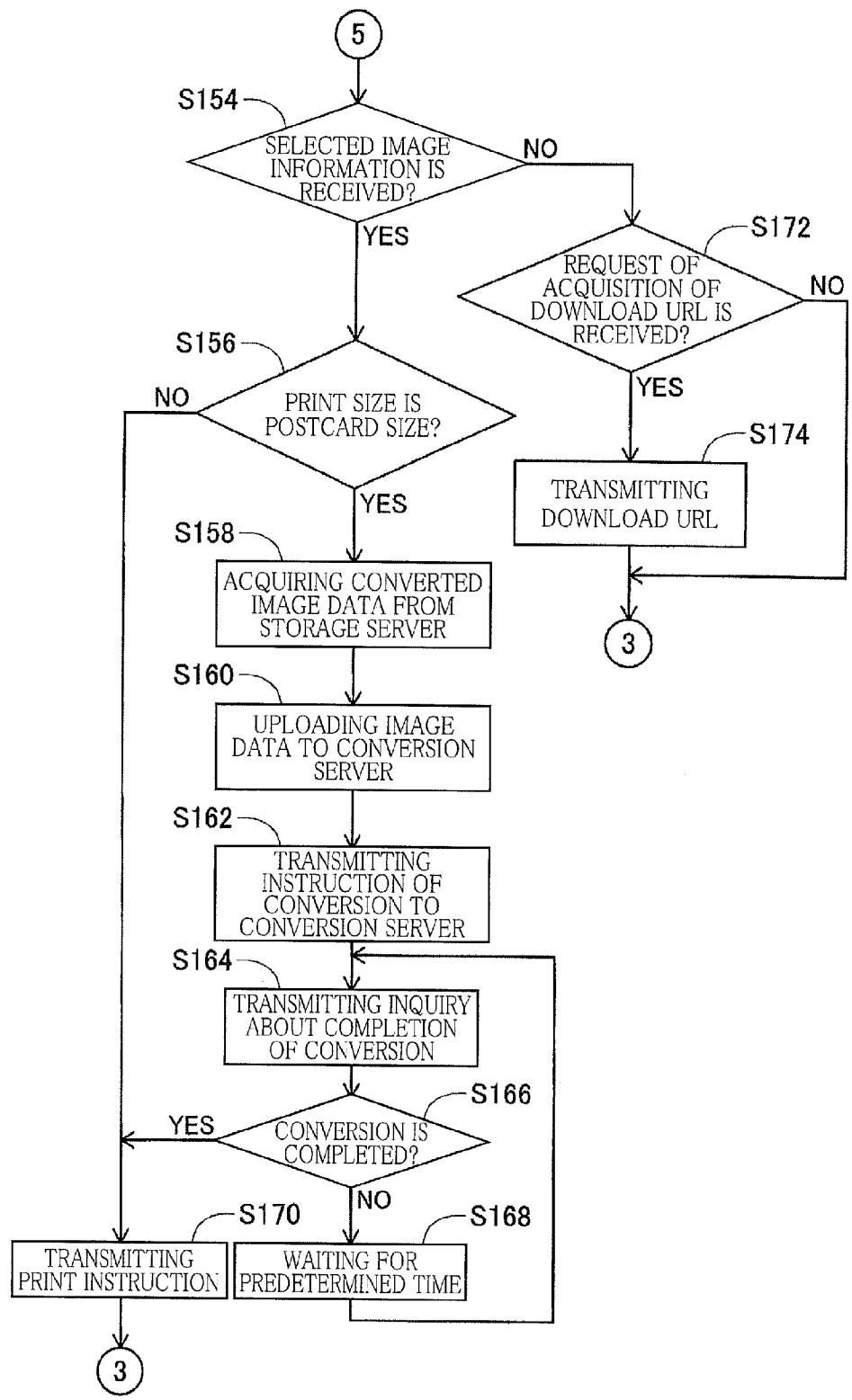
FIG. 12 is a flow chart illustrating processings executed by the relay server.

In the communication system 1, as described above, the converted image data converted in the conversion server 60 is stored into the storage server 70. Thereafter, in response to the print request issued from the MFP 30, the converted image data stored in the storage server 70 is transmitted to the MFP 30 and printed by the MFP 30. There will be next explained (i) a processing for transmitting the converted image data to the MFP 30 and (ii) a print processing executed by the MFP 30, with reference to FIGS. 6-8.

First, the user at M146 operates a button provided on the MFP 30 to print an image using an event name and the converted image data stored in the storage server 70. In response to the operation of the button, the MFP 30 at M148 sends the relay server 10 a request of transmission of a re-print content containing the event name. When having received the request of transmission of the re-print content, the relay server 10 at M150 acquires, from the database 80, the destination location information identified by the Mac address of the MFP 30. The relay server 10 at M152 checks whether or not the acquired destination location information contains a combination of the account display name and the server name associated with the event name transmitted at M148.

When the destination location information contains the combination of the account display name and the server name of the destination location of the converted image data which is set in the MFP 30, the relay server 10 at M154 sends the MFP 30 an instruction of transmission of the account information. When having received the instruction of acquisition of the account information, the MFP 30 at M156 sends the relay server 10 all the sets of account information stored in the data storage area 53. At M158, the relay server 10 checks that the received account information contains the combination of the account display name and the server name of the destination location of the converted image data, which combination is checked at M152. The relay server 10 then extracts the authentication token and determines (i) a storage server 70 as the destination location of the converted image data and (ii) an account in the storage server 70. When the relay device thereafter communicates with the storage server 70, the relay device uses the extracted authentication token.

The relay server 10 at M160 transmits, to the determined storage server 70 as the destination location of the converted image data, a request of transmission of an identification ID and a URL of the stored image and a URL of a thumbnail of the image. When having received the request of transmission, the storage server 70 at M162 sends the relay server 10 the identification ID and the URL of the stored image and the URL of the thumbnail of the image. However, there may be a case where no converted image data is stored in the storage server 70 because the user uses an information processing device such as a PC to directly access the storage server and instruct a deletion of the converted image data, for example. In such a case, the storage server 70 sends the relay server 10 information indicating that no images are stored. When having received the information indicating that no images are stored, the relay server 10 at M164 sends the MFP 30 an instruction for controlling the panel 36 to display images based on image data stored in the USB memory 48. With these processings, even in the case where no converted image data are stored in the storage server 70, the user of the MFP 30 can select a desired image from among the images based on the image data stored in the USB memory 48. It is noted that also in the case where it is determined at M152 that the destination location information does not contain the combination of the account display name and the server name associated with the event name transmitted at M148, the relay server 10 sends the MFP 30 the instruction for controlling the panel 36 to display the images based on the image data stored in the USB memory 48. In this case, the processings at M154-M162 are not executed.

When having received the identification ID and the URL of the stored image and the URL of the thumbnail of the image, the relay server 10 at M166 sends the MFP 30 (i) the received thumbnail URL (as one example of fourth download information) or an URL indicating the relay server 10 as an access destination and containing a command for converting the size of image data acquired based on the extracted thumbnail URL, (ii) an ID assigned to the URL, and (iii) an instruction for displaying an image selection screen. The image selection screen is a screen for displaying a list of the thumbnail images stored in the storage server 70, and the user selects a desired one of the thumbnail images. To display the image selection screen, the MFP 30 uses the thumbnail URL transmitted at M166, to acquire thumbnail data from the storage server 70 or the relay server 10. Here, there will be explained a reason why the relay server 10 selectively transmits one of the two types of the thumbnail URLs (i.e., the thumbnail URL received from the storage server 70 and the URL indicating the relay server 10 as the access destination and containing the command for converting the size of the image data acquired based on the extracted thumbnail URL). Some data size or data format may not allow the MFP 30 to display thumbnail images. Thus, the MFP 30 may or may not display images based on the thumbnail data acquired from the storage server 70 based on the thumbnail URL. For this reason, in the case where the MFP 30 can display the images based on the thumbnail data stored in the storage server 70, the relay server 10 transmits (i) the instruction for displaying the image selection screen, (ii) the URL of the thumbnail, and (iii) the ID of the thumbnail, to the MFP 30. In the case where the MFP 30 cannot display the images based on the thumbnail data stored in the storage server 70, on the other hand, the relay server 10 transmits (i) the instruction for displaying the image selection screen, (ii) the URL indicating the relay server 10 as the access destination and containing the command for converting the size of the image data acquired based on the extracted thumbnail URL, and (iii) the ID, to the MFP 30.

Accordingly, when having received, from the relay server 10, the image-selection-screen displaying instruction containing the thumbnail URL transmitted from the storage server 70, the MFP 30 at M168 uses this thumbnail URL to send the storage server 70 a request of transmission of thumbnail data. The storage server 70 at M170 transmits the thumbnail data to the MFP 30. When having received, from the relay server 10, the URL indicating the relay server 10 as the access destination, the MFP 30 at M172 uses this URL to send the relay server 10 a request of transmission of thumbnail data. When having received the request of transmission of the thumbnail data, the relay server 10 at M174 sends the storage server 70 the request of transmission of the thumbnail data. When having received the request of transmission of the thumbnail data, the storage server 70 at M176 transmits the thumbnail data to the relay server 10. When having received the thumbnail data, the relay server 10 at M177 converts the thumbnail data to data displayable on the MFP 30. The relay server 10 at M178 transmits the converted thumbnail data to the MFP 30.

When having received the thumbnail data, the MFP 30 at M180 controls the panel 36 to display the image selection screen based on the thumbnail data. The user at M182 selects a desired one of the images displayed on the image selection screen. The MFP 30 at M184 sends the relay server 10 an ID corresponding to the image selected by the user. When having received the ID of the selected image, the relay server 10 identifies, based on the event name transmitted at M148, the size of a sheet on which the selected image is to be printed.

Specifically, in the case where the NewYearCard has been selected as the event name, the image data is used for printing on the New Year Card, and accordingly the relay server 10 identifies the sheet size as the postcard size. In the case where the event name is the Business, the image data is used for printing on a business document, and accordingly the relay server 10 identifies the sheet size as the A4 size. It is noted that the determination information for determining the size of the sheet on which the selected image is to be printed may be stored in the database 80 in association with the account display name and the identification information for identifying the storage server. For example, the relay server 10 at M184 receives the determination information indicating the sheet size of the selected image, from the MFP 30, in addition to the ID of the selected image. The relay server 10 thereafter stores the received determination information into the database 80 in association with the account display name and the identification information for identifying the storage server. When the relay server 10 later receives, from the MFP 30, a request of transmission of the account display name and the converted image for which the identification information about the storage server has been identified, the relay server 10 extracts the determination information stored in the database 80 and determines the size of the sheet on which the selected image is to be printed, based on the received account display name and the received identification information about the storage server. This configuration increases flexibility in setting the size of the sheet on which the selected image is to be printed, when compared with a configuration in which the size of the sheet on which the selected image is to be printed is determined based on the event name.

When the sheet size is a size different from the postcard size, for example, when the event name is the Business, and the sheet size is the A4 size, the relay server 10 at M186 transmits a print instruction to the MFP 30. When having received the print instruction, the MFP 30 at M188 sends the relay server 10 a request of transmission of a URL (as one example of third download information) for downloading the converted image data from the storage server 70. When having received the request of transmission of the download URL, the relay server 10 at M190 sends the MFP 30 the download URL corresponding to the selected image. The MFP 30 at M192 uses the download URL to request a download of the converted image data stored in the storage server 70. In response to the request of the download, the storage server 70 at M194 transmits the converted image data to the MFP 30.

On the other hand, when the sheet size is the postcard size, for example, when the event name is the NewYearCard, there is a need that the converted image data stored in the storage server 70 is converted to the image data in the form for printing of the postcard, and the MFP 30 acquires the converted image data. Thus, when the print size of the selected image is the postcard size, the relay server 10 at M196 sends the storage server 70 a request of transmission of the converted image data indicative of the selected image. When having received the request of transmission of the converted image data, the storage server 70 at M198 transmits the converted image data to the relay server 10. It is noted that in the case where the sheet size is a size larger than the A4 size (e.g., the A3 size), the converted image data may be created by adding pixels having no gray level values to the converted image data such that an image on the sheet of the size larger than the A4 size contains an image on the sheet of the A4 size in a ratio of the size of the image matched to the sheet of the A4 size, to the size of the image matched to the sheet of the size larger than the A4 size.

When having received the converted image data, the relay server 10 at M200 uploads the converted image data to the conversion server 60. Upon the upload of the converted image data, the conversion server 60 at M202 transmits a response to the relay server 10. When having received the response from the conversion server 60, the relay server 10 at M204 sends the conversion server 60 an instruction of conversion of the converted image data, specifically, an instruction for converting the converted image data to the image data in the form for printing of the postcard. When having received the instruction of conversion, the conversion server 60 at M206 transmits a response to the relay server 10 and at M208 executes a conversion processing for the image data.

The relay server 10 at M210 sends the conversion server 60 an inquiry about whether the conversion processing for the image data is completed or not. When the conversion processing for the image data is completed, the conversion server 60 at M212 sends the relay server 10 a response indicating the completion of the conversion processing. When the conversion processing for the image data is not completed, the conversion server 60 at M212 sends the relay server 10 a response indicating that the conversion processing is not completed. When the response indicating the completion of the conversion processing is received from the conversion server 60, the relay server 10 at M214 transmits a print instruction to the MFP 30.

When having received the print instruction, the MFP 30 at M216 sends the relay server 10 a request of transmission of a URL which is for downloading converted image data from the conversion server 60 (noted that the URL is one example of first download information). When having received the request of transmission of the download URL, the relay server 10 at M218 transmits the download URL to the MFP 30. The MFP 30 at M220 uses the download URL to request a download of the converted image data converted in the conversion server 60. When having received the request of the download, the conversion server 60 at M222 transmits the converted image data to the MFP 30. The MFP 30 at M224 executes a print processing for the image based on the received converted image data. The MFP 30 at M226 sends the relay server 10 a notification indicating the completion of the print processing. As a result, the re-print processing using the converted image data is finished.

Communication Program

In the relay server 10, as described above, the converted image data converted in the storage server 70 is stored into the storage server 70, and the MFP 30 executes the print processing for the image based on the converted image data. The storing of the converted image data into the storage server 70 and the print processing executed by the MFP 30 are executed by execution of the communication program 24 by the CPU 12 of the relay server 10. There will be next explained, with reference to FIGS. 9-12, a flow when the communication program 24 is executed.

When the communication program 24 is executed, this flow begins with S100 at which the CPU 12 determines whether any request has been received or not. When no request is received (S100: NO), the processing at S100 is repeated. When a request is received (S100: YES), the CPU 12 at S102 determines whether the received request is a response for the first account information or not. That is, the CPU 12 determines whether the response for the first account information has been received or not.

When the response for the first account information is received (S102: YES), the CPU 12 at S104 acquires the destination location information from the database 80. The CPU 12 at S106 determines, based on the acquired destination location information, whether the destination location of the converted image data has been set or not. When the destination location of the converted image data is not set (S106: NO), the CPU 12 at S108 transmits the instruction of displaying of the server selection screen to the MFP 30, and this flow ends.

When the response for the first account information is not received (S102: NO), the CPU 12 at S110 determines whether the instruction for storing to the server has been received or not. When the instruction for storing to the server is received (S110: YES), the CPU 12 at S112 transmits an instruction for acquiring the first account information to the MFP 30, and this flow ends.

When the instruction for storing to the server is not received (S110: NO), the CPU 12 at S114 determines whether information about the server selected on the server selection screen has been received or not. When the information about the selected server is received (S114: YES), the CPU 12 at S116 transmits an instruction for acquiring the second account information to the MFP 30, and this flow ends.

When the information about the selected server is not received (S114: NO), the CPU 12 at S118 determines whether a response for the second account information has been received or not. When the response for the second account information is received (S118: YES), the CPU 12 at S120 transmits an instruction for displaying the account selection screen to the MFP 30, and this flow ends.

When the response for the second account information is not received (S118: NO), the CPU 12 at S122 determines whether information about an account input on the account selection screen has been received or not. When the information about the account is received (S122: YES), the CPU 12 at S124 transmits the received information about the server and the received information about the account to the database 80 as settings of the destination location. The CPU 12 at S126 determines the server and the account based on the information transmitted to the database 80, as the server as the destination location and the account. It is noted that also when the destination location of the converted image data is set at S106 (S106: YES), the CPU 12 executes the processing at S126.

When the server as the destination location and the account are determined, the CPU 12 at S128 acquires the converted image data from the conversion server 60. At S130, the converted image data acquired from the conversion server 60 is uploaded to the storage server 70. The CPU 12 at S132 transmits a notification about the completion of the upload, to the MFP 30, and this flow ends.

When the information about the account is not received (S122: NO), the CPU 12 at S134 determines whether a request of the re-print content has been received or not. When the request of the re-print content is received (S134: YES), the CPU 12 at S136 acquires destination location information from the database 80. The CPU 12 at S138 determines, based on the acquired destination location information, whether the destination location of the converted image data has been set or not. When the destination location of the converted image data is set (S138: YES), the CPU 12 at M140 transmits an instruction for acquiring the third account information to the MFP 30, and this flow ends. When the destination location of the converted image data is not set (S138: NO), an the CPU 12 at M142 sends the MFP 30 an instruction for controlling the panel 36 to display images based on image data stored in the USB memory 48, and this flow ends.

When the request of the re-print content is not received (S134: NO), the CPU 12 at S144 determines whether a response for the third account information has been received or not. When the response for the third account information is received (S144: YES), the CPU 12 at S146 determines the server as the destination location and the account based on the destination location information. The CPU 12 at S148 transmits a request of transmission of an image list to the storage server 70. The CPU 12 at S150 determines whether an image list is stored in the storage server 70 or not.

Specifically, when the image list is stored in the storage server 70, the storage server 70 sends the relay server 10 a URL for acquiring thumbnail data indicative of the image list, as the response of the request of transmission of the image list, and when no image list is stored in the storage server 70, the storage server 70 sends the relay server 10 a notification indicating that no image list is stored, as the response of the request of transmission of the image list. Accordingly, when the URL for acquiring the thumbnail data indicative of the image list is received, the relay server 10 determines that the image list is stored in the storage server 70, and when the notification indicating that no image list is stored is received, the relay server 10 determines that no image list is stored in the storage server 70.

When the URL for acquiring the thumbnail data indicative of the image list is received, that is, when the image list is stored in the storage server 70 (S150: YES), the CPU 12 at S152 transmits an instruction for displaying the image selection screen to the MFP 30, and this flow ends. When the notification indicating that no image list is stored is received, that is, when no image list is stored in the storage server 70 (S150: NO), this flow goes to S142.

When the response for the third account information is not received (S144: NO), the CPU 12 at S154 determines whether information about an image selected on the image selection screen has been received or not. When the information about the selected image is received (S154: YES), the CPU 12 at S156 determines whether the print size of the selected image is the postcard size or not. Specifically, the CPU 12 determines whether image data indicative of the selected image is classified into the NewYearCard (as the function name) or not, and when the image data is classified into the NewYearCard (as the function name), the CPU 12 determines that the print size of the selected image is the postcard size.

When the print size of the selected image is the postcard size (S156: YES), the CPU 12 at 5158 acquires the converted image data from the storage server 70. The CPU 12 at S160 uploads the acquired converted image data to the conversion server 60. The CPU 12 at S162 sends the conversion server 60 an instruction for converting the converted image data to image data for printing which is matched to the document of the postcard size. The CPU 12 at S164 sends the conversion server 60 an inquiry about whether the conversion of the converted image data is completed or not.

The CPU 12 at S166 determines whether the conversion processing in the conversion server 60 is completed or not. Specifically, when the conversion processing in the conversion server 60 is completed, the CPU 12 transmits a notification about completion of the conversion processing to the relay server 10 as a response to the inquiry transmitted to the conversion server 60, and when the conversion processing in the conversion server 60 is not completed, the CPU 12 transmits a notification indicating that the conversion processing is not completed, to the relay server 10 as the response to the inquiry transmitted to the conversion server 60. Accordingly, when the notification about completion is received by the relay server 10, the CPU 12 determines that the conversion processing in the conversion server 60 is completed, and when the notification indicating that the conversion processing is not completed is received by the relay server 10, the CPU 12 determines that the conversion processing in the conversion server 60 is not completed.

When the conversion processing in the conversion server 60 is not completed (S166: NO), the CPU 12 at S168 waits for a predetermined length of time, and this flow returns to S164. When the conversion processing in the conversion server 60 is completed (S166: YES), the CPU 12 at 5170 transmits the print instruction to the MFP 30, and this flow ends. It is noted that also when the print size of the selected image is not the postcard size (S156: NO), the processing at 5170 is executed.

When the information about the selected image is not received at S154 (S154: NO), the CPU 12 at S172 determines whether a request of acquisition of the download URL has been received or not. When the request of acquisition of the download URL is received (S172: YES), the CPU 12 at S174 transmits the download URL to the MFP 30, and this flow ends. It is noted that also when the request of acquisition of the download URL is not received (S172: NO), this flow ends.

Effects

In the relay server 10 as described above, the image data converted by the conversion server 60 is transmitted to the storage server 70 in association with the authentication token transmitted from the MFP 30. With this processing, the MFP 30 can re-acquire the image data previously converted by the conversion server, by designating the authentication token and transmitting the request of the converted image data. That is, even the MFP 30 including a storage capable of only a small amount of data can acquire image data indicative of images previously printed, without using, e.g., an external memory. This configuration increases usability of a print processing utilizing the communication system 1.

Functional Configuration of CPU

In view of the processings executed by the CPU 12, the CPU 12 which executes the communication program 24 of the relay server 10 can be considered to have a functional configuration illustrated in FIG. 1. As illustrated in FIG. 1, the CPU 12 includes an authentication token acquirer 100, an image-data/authentication-token transmitter 102, an information outputter 104, a transmission request acquirer 106, an information acquirer 108, a converted image data re-acquirer 110, a first download information transmitter 112, a converted image data transmitter 114, a ratio change instruction transmitter 116, an extractor 118, a converted image data acquirer 120, a display instruction transmitter 122, a conversion request acquirer 124, and a first conversion instruction transmitter 126.

The authentication token acquirer 100 is a functional portion which executes the processing at S102 in the communication program 24. The image-data/authentication-token transmitter 102 is a functional portion which executes the processing at S130 in the communication program 24. The information outputter 104 is a functional portion which executes the processing at S124 in the communication program 24. The transmission request acquirer 106 is a functional portion which executes the processing at S134 in the communication program 24. The information acquirer 108 is a functional portion which executes the processing at S136 in the communication program 24. The converted image data re-acquirer 110 is a functional portion which executes the processing at S148 in the communication program 24. The first download information transmitter 112 is a functional portion which executes the processing at S174 in the communication program 24. The converted image data transmitter 114 is a functional portion which executes the processing at S160 in the communication program 24. The ratio change instruction transmitter 116 is a functional portion which executes the processing at S162 in the communication program 24. The extractor 118 is a functional portion which executes the processing at S138 in the communication program 24. The converted image data acquirer 120 is a functional portion which executes the processing at S128 in the communication program 24. The display instruction transmitter 122 is a functional portion which executes the processing at S142 in the communication program 24. The conversion request acquirer 124 is a functional portion which executes the processing at M28 in the sequence diagram illustrated in FIG. 2. The first conversion instruction transmitter 126 is a functional portion which executes the processing at M30 in the sequence diagram illustrated in FIG. 2. A third download information acquirer is a functional portion which executes the processing at M188 in the sequence diagram illustrated in FIG. 7. A third download information transmitter is a functional portion which executes the processing at S174 in the communication program 24. A fourth download information transmitter is a functional portion which executes the processing at M166 in the sequence diagram illustrated in FIG. 6. A fourth download information acquirer is a functional portion which executes the processing at M162 in the sequence diagram illustrated in FIG. 6.

While the embodiment has been described above, it is to be understood that the disclosure is not limited to the details of the illustrated embodiment, but may be embodied with various changes and modifications, which may occur to those skilled in the art, without departing from the spirit and scope of the disclosure. Specifically, the image data for displaying is stored in the storage server 70 in the above-described embodiment, but in the case where the sheet size is the postcard size, the image data for displaying and the image data for printing (i.e., the converted image data in the form for printing of the postcard) may be stored in the storage server 70. Only differences between this modification and the above-described embodiment will be explained. In the sequence diagrams, at M136, in the case where the sheet size of the selected event is the postcard size, the relay server 10 requests the conversion server to transmit the converted image data for printing and displaying. At M138, the relay server 10 receives the converted image data for printing and displaying. At M140, the relay server 10 uploads the converted image data for printing and displaying. In this processing, information (e.g., a file name or an ID) is attached for indicating that the converted image data for printing and the converted image data for displaying are in a pair. At M160, in the case where the sheet size of the selected event is the postcard size, the relay server 10 requests thumbnail URLs, IDs, and URLs of the converted image data for both of the converted image data for printing and displaying. At M166, the relay server 10 sends the MFP data in which the ID corresponding to the image for printing is associated with the thumbnail URL for the image for displaying. The processings at M196-M222 are not executed. In the case where the sheet size is not the postcard size, the ID corresponding to the converted image data for printing is designated at M188, and accordingly the MFP 30 transmits a URL for acquiring the converted image data corresponding to the designated ID.

While the relay server 10 and the database 80 are independent of each other in the above-described embodiment, the relay server 10 and the database 80 may be constituted by one device, for example.

The recording device is not limited to the ink-jet head and may be a device configured to record an image using electronic photography, thermal recording, or other similar methods.

In the above-described embodiment, the processings illustrated in FIGS. 9-12 are executed by the CPU 12. These processings do not need to be executed by the CPU 12 and may be executed by an ASIC or another or other similar logical integrated circuits and may be executed by cooperation of the CPU, the ASIC, and the logical integrated circuit, for example.

What is claimed is:

1. A server system, comprising:
a communication device communicable with a recording apparatus and a storage server configured to store image data; and
a controller configured to:
convert image data;
acquire, from the recording apparatus, a storing instruction for storing the converted image data into the storage server;
when the storing instruction is acquired, acquire account identification information from the recording apparatus via the communication device, the account identification information being for identifying an account of the recording apparatus in the storage server; and
transmit the converted image data and the acquired account identification information to the storage server via the communication device in a state in which the converted image data and the acquired account identification information are associated with each other.

2. The server system according to claim 1, wherein the account identification information in the storage server is an authentication token issued by the storage server.

3. The server system according to claim 2, wherein the controller is configured to:
acquire an account display name of the account identified based on the account identification information; and
output storage-server identification information and the acquired account display name to a memory in a state in which the storage-server identification information and the acquired account display name are associated with each other, the storage-server identification information being for identifying the storage server as a destination of transmission of the transmitted converted image data.

4. The server system according to claim 3, wherein the controller is configured to transmit converted image data for displaying, converted image data for printing, and the acquired authentication token to the storage server via the communication device in a state in which the acquired authentication token and each of the converted image data for displaying and the converted image data for printing are associated with each other.

5. The server system according to claim 3, wherein the controller is configured to:
acquire a request of transmission of the converted image data transmitted to the storage server, from the recording apparatus via the communication device;
when the request of transmission is acquired, acquire the storage-server identification information and the account display name from the memory;
acquire third download information and fourth download information from the storage server, using the authentication token identified based on the acquired account display name, the third download information being for downloading, from the storage server, converted image data for printing which is transmitted to the storage server identified based on the acquired storage-server identification information, the fourth download information being for downloading, from the storage server, image data for thumbnail displaying which is based on converted image data for displaying; and
transmit the acquired third download information and the acquired fourth download information to the recording apparatus via the communication device.

6. The server system according to claim 3, wherein the controller is configured to:
acquire a request of transmission of the converted image data transmitted to the storage server, from the recording apparatus via the communication device;
when the request of transmission is acquired, acquire the storage-server identification information and the account display name from the memory; and
transmit second download information for downloading the converted image data transmitted to the storage server identified based on the acquired storage-server identification information, from the storage server to the recording apparatus, using the account identification information corresponding to the acquired account display name.

7. The server system according to claim 3,
wherein the memory is an external device communicable with the controller via the communication device, and
wherein the controller is configured to transmit the storage-server identification information and the account display name to the memory via the communication device in the state in which the storage-server identification information and the account display name are associated with each other.

8. The server system according to claim 3, wherein the controller is configured to:
acquire a request of transmission of the converted image data transmitted to the storage server, from the recording apparatus via the communication device;
when the request of transmission is acquired, acquire the storage-server identification information and the account display name from the memory;
acquire the converted image data transmitted to the storage server identified based on the acquired storage-server identification information, from the storage server via the communication device, using the account identification information corresponding to the acquired account display name;
change a ratio of the image such that an image based on the transmitted converted image data is printed so as to be matched to a recording medium used by the recording apparatus; and
transmit first download information to the recording apparatus via the communication device, the first download information being for downloading ratio-changed image data converted by the controller based on the transmitted image-ratio setting instruction.

9. The server system according to claim 8, wherein the controller is configured to:
acquire a plurality of sets of the storage-server identification information and a plurality of the account display names from the recording apparatus via the communication device and extract the storage-server identification information and the account display name respectively coinciding with the storage-server identification information and the account display name acquired from the memory, from the plurality of sets of the storage-server identification information and the plurality of the account display names; and
acquire the converted image data transmitted to the storage server identified based on the extracted storage-server identification information, from the storage server via the communication device, using the authentication token for identifying the account corresponding to the extracted account display name.

10. The server system according to claim 9, wherein the controller is configured to transmit an instruction for causing the recording apparatus to control a display to display an image based on image data stored in the recording apparatus, to the recording apparatus via the communication device when the storage-server identification information and the account display name acquired from the recording apparatus do not comprise the storage-server identification information and the account display name respectively coinciding with the storage-server identification information and the account display name acquired from the memory.

11. The server system according to claim 8, wherein the controller is configured to:
output determination information to the memory in addition to the storage-server identification information and the account display name, the determination information being for determining a size of the recording medium on which the image based on the transmitted converted image data is to be recorded;
when the request of transmission is acquired, acquire the determination information from the memory in addition to the storage-server identification information and the account display name; and
change the ratio of the image such that the image based on the transmitted converted image data is to be printed so as to be matched to the recording medium of the size determined by the acquired determination information.

12. The server system according to claim 8, wherein the controller is configured to add a pixel comprising no gray level value to the converted image data, such that an image whose ratio is changed comprises an image based on the converted image data in a ratio of a size of an image matched to a predetermined recording medium to a size of an image matched to the recording medium of a size greater than a size of the predetermined recording medium.

13. The server system according to claim 8, wherein the controller is configured to transmit the converted ratio-changed image data to the recording apparatus via the communication device when the controller receives a request of download of the converted ratio-changed image data from the recording apparatus based on the first download information.

14. A control method implementable by a processor of a server system, the server system comprising a communication device communicable with a recording apparatus and a storage server configured to store image data,
the control method, when implemented by the processor of the server system, causing the server system to:
convert image data;
acquire, from the recording apparatus, a storing instruction for storing the converted image data into the storage server;
when the storing instruction is acquired, acquire account identification information from the recording apparatus via the communication device, the account identification information being for identifying an account of the recording apparatus in the storage server; and
transmit the converted image data and the acquired account identification information to the storage server via the communication device in a state in which the converted image data and the acquired account identification information are associated with each other.

15. The control method according to claim 14, wherein the account identification information in the storage server is an authentication token issued by the storage server.

16. The control method according to claim 15, wherein when implemented by the processor, the control method causes the server system to:
acquire an account display name of the account identified based on the account identification information; and
output storage-server identification information and the acquired account display name to a memory in a state in which the storage-server identification information and the acquired account display name are associated with each other, the storage-server identification information being for identifying the storage server as a destination of transmission of the transmitted converted image data.

17. The control method according to claim 16,
wherein the memory is an external device communicable with the server system via the communication device, and wherein when implemented by the processor, the control method causes the server system to transmit the storage-server identification information and the account display name to the memory via the communication device in the state in which the storage-server identification information and the account display name are associated with each other.

18. The control method according to claim 16, wherein when implemented by the processor, the control method causes the server system to:
acquire a request of transmission of the converted image data transmitted to the storage server, from the recording apparatus via the communication device;
when the request of transmission is acquired, acquire the storage-server identification information and the account display name from the memory; and
transmit second download information for downloading the converted image data transmitted to the storage server identified based on the acquired storage-server identification information, from the storage server to the recording apparatus, using the account identification information corresponding to the acquired account display name.

19. The control method according to claim 16, wherein when implemented by the processor, the control method causes the server system to transmit converted image data for displaying, converted image data for printing, and the acquired authentication token to the storage server via the communication device in a state in which the acquired authentication token and each of the converted image data for displaying and the converted image data for printing are associated with each other.

20. The control method according to claim 16, wherein when implemented by the processor, the control method causes the server system to:
acquire a request of transmission of the converted image data transmitted to the storage server, from the recording apparatus via the communication device;
when the request of transmission is acquired, acquire the storage-server identification information and the account display name from the memory;
acquire third download information and fourth download information from the storage server, using the authentication token identified based on the acquired account display name, the third download information being for downloading, from the storage server, converted image data for printing which is transmitted to the storage server identified based on the acquired storage-server identification information, the fourth download information being for downloading, from the storage server, image data for thumbnail displaying which is based on converted image data for displaying; and
transmit the acquired third download information and the acquired fourth download information to the recording apparatus via the communication device.

21. The control method according to claim 16, wherein when implemented by the processor, the control method causes the server system to:
acquire a request of transmission of the converted image data transmitted to the storage server, from the recording apparatus via the communication device;
when the request of transmission is acquired, acquire the storage-server identification information and the account display name from the memory;
acquire the converted image data transmitted to the storage server identified based on the acquired storage-server identification information, from the storage server via the communication device, using the account identification information corresponding to the acquired account display name;
change a ratio of the image such that an image based on the transmitted converted image data is printed so as to be matched to a recording medium used by the recording apparatus; and
transmit first download information to the recording apparatus via the communication device, the first download information being for downloading ratio-changed image data converted by the server system based on the transmitted image-ratio setting instruction.

22. The server system according to claim 21, wherein the controller is configured to transmit the converted ratio-changed image data to the recording apparatus via the communication device when the controller receives a request of download of the converted ratio-changed image data from the recording apparatus based on the first download information.

23. The control method according to claim 21, wherein when implemented by the processor, the control method causes the server system to:
output determination information to the memory in addition to the storage-server identification information and the account display name, the determination information being for determining a size of the recording medium on which the image based on the transmitted converted image data is to be recorded;
when the request of transmission is acquired, acquire the determination information from the memory in addition to the storage-server identification information and the account display name; and
change the ratio of the image such that the image based on the transmitted converted image data is to be printed so as to be matched to the recording medium of the size determined by the acquired determination information.

24. The control method according to claim 21, wherein when implemented by the processor, the control method causes the server system to add a pixel comprising no gray level value to the converted image data, such that an image whose ratio is changed comprises an image based on the converted image data in a ratio of a size of an image matched to a predetermined recording medium to a size of an image matched to the recording medium of a size greater than a size of the predetermined recording medium.

25. The control method according to claim 21, wherein when implemented by the processor, the control method causes the server system to:
acquire a plurality of sets of the storage-server identification information and a plurality of the account display names from the recording apparatus via the communication device and extract the storage-server identification information and the account display name respectively coinciding with the storage-server identification information and the account display name acquired from the memory, from the plurality of sets of the storage-server identification information and the plurality of the account display names; and
acquire the converted image data transmitted to the storage server identified based on the extracted storage-server identification information, from the storage server via the communication device, using the authentication token for identifying the account corresponding to the extracted account display name.

26. The control method according to claim 25, wherein when implemented by the processor, the control method causes the server system to transmit an instruction for causing the recording apparatus to control a display to display an image based on image data stored in the recording apparatus, to the recording apparatus via the communication device when the storage-server identification information and the account display name acquired from the recording apparatus do not comprise the storage-server identification information and the account display name respectively coinciding with the storage-server identification information and the account display name acquired from the memory.

* * * * *